May 11, 1926. 1,584,079
W. F. COOK
ANT TRAP
Filed Oct. 17, 1924

Inventor
William F. Cook
by Oring & Hague, Attys.

Patented May 11, 1926.

1,534,079

UNITED STATES PATENT OFFICE.

WILLIAM F. COOK, OF CRYSTAL CITY, TEXAS.

ANT TRAP.

Application filed October 17, 1924. Serial No. 744,125.

The object of my invention is to provide a trap of simple, durable and inexpensive construction designed to be placed in position surrounding an ant hill, and so arranged that ants traveling either toward or from the ant hill will necessarily pass into the trap where they can be readily and easily exterminated.

My invention is particularly adapted for use in connection with that species of ant whose bite is poisonous and which frequently attack humans and particularly children, and which also destroy agricultural products and poultry.

My invention consists in the construction, arrangement and combination of the various part of the device, whereby the objects contemplated are attained, as hereinafter more fully set forth, pointed out in my claim, and illustrated in the accompanying drawings, in which:

Figure 1:
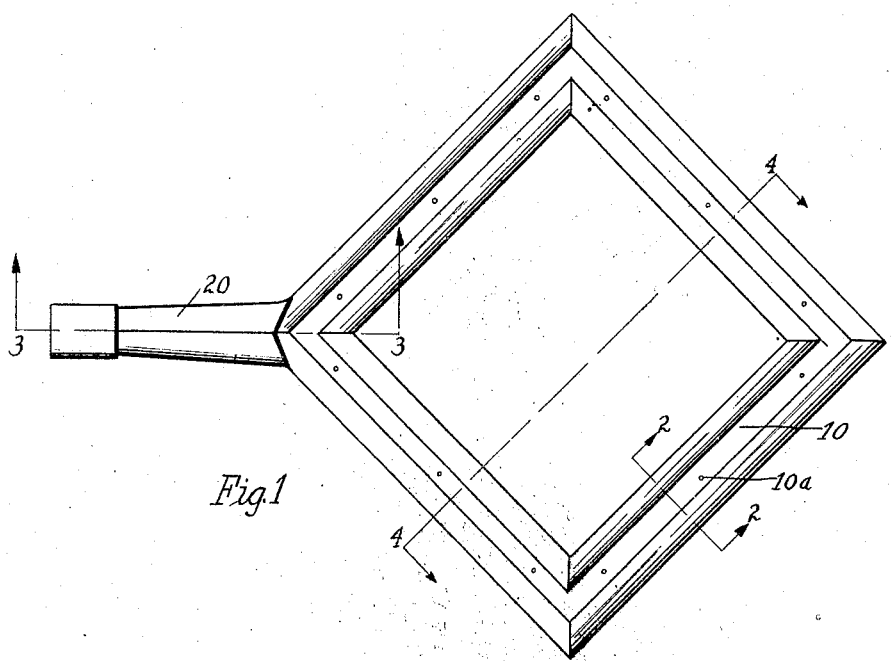
Figure 1 shows a plan view of a trap embodying my invention.

Referring to the accompanying drawings, it will be noted that my improved trap is of rectangular outline, and that each of its four sides is formed of a single piece of sheet metal, preferably comprising a flat base 10, an upright inner wall 11 and an upright outer wall 12. In the bottom of the member 10 I have provided a series of drainage openings 10ᵃ. At the top of the inner wall the sheet metal is rounded upwardly and inwardly at 13, then inwardly and downwardly at 14, and then downwardly and outwardly at 15, the edge of the metal being spaced apart a considerable distance from the bottom 10 and a relatively short distance from the wall 11. The outer wall has a similarly curved upper surface, it being inclined upwardly and inwardly at 17, inwardly and downwardly at 18, and downwardly and outwardly at 19, and its edge is spaced apart a considerable distance from the bottom 10 and a relatively short distance from the wall 12.

The four corners of the trap are preferably permanently connected by solder or otherwise, and at one of the corners thereof is the outlet passage device. This outlet passage device comprises a hollow body portion indicated generally by the numeral 20, with its lower end open and fitted into the body portion of the trap. It is preferably inclined from the body portion of the trap upwardly and outwardly.

Mounted in the bottom of this outlet passage 20 is a strip of metal permanently secured in position, having its top roughened, as shown by the numeral 21. This rough surface extends upwardly and outwardly to a point a short distance within the outlet passage way 21, and at that point the top surface is left smooth and polished, and curves downwardly and outwardly at 22, and then downwardly and inwardly at 23. At the sides of this curved portion 22 and 23 I have formed wings 24 on the sides of the outlet passage which project outwardly and downwardly beyond the rounded surfaces 22 and 23.

Figure 4:
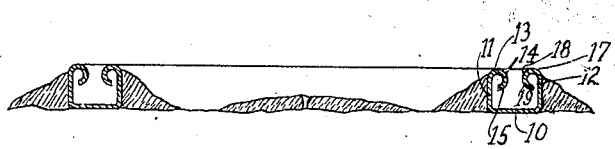
Figure 4 shows a transverse sectional view of my improved trap taken on the line 4—4 of Figure 1, and showing an ant hill and the arrangement of the earth relative thereto as in practical use.
Figure 3:
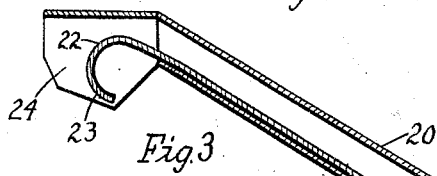
Figure 3 shows a longitudinal sectional view on the line 3—3 of Figure 1.
Figure 2:
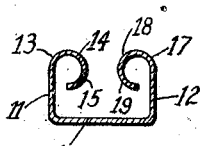
Figure 2 shows a transverse sectional view on the line 2—2 of Figure 1.
Figure 5:
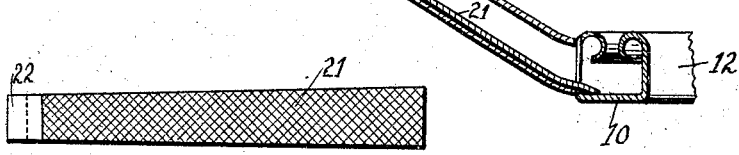
Figure 5 shows a plan view of the rough surfaced outlet member.

In practical use the operator places the ant trap in position on the ground surface surrounding the ant hill in which reside the ants to be destroyed. He then arranges the earth adjacent to the inner wall of the ant trap in position substantially level with the top of the inner wall, and he also arranges the earth adjacent to the outer wall in position inclined downwardly and outwardly from the upper edge of the outer wall, as clearly illustrated in Figure 4, and this may be done at any time whether the ants are all contained within the ant hill or whether a large number of them are foraging away from the ant hill. By repeated experiments it has been demonstrated that ants traveling either from or to the hill will, when they walk upon the rounded top edge of the ant trap, not hesitate to move down into the depression at the center of the trap, and when they once start to move, the incline of the trap, together with its smooth polished surface, will cause the ant's feet to lose traction on the surface and cause the ant to drop into the depression. After the ants are once in the depression, it is impossible for them to get out, except through the outlet passageway, and on account of the rough surface on the bottom of this outlet passageway, they can easily ascend to the discharge end thereof where there is the same inclined polished surface over which they will slide into a receptacle, such for instance as a can filled with kerosene or other insecticide. Hence, all ants that once enter the depression are destroyed.

There is usually contained within the ant hill a number of so-called warrior ants, one or more queens and perhaps a number of so-called nurse ants, which do not ordinarily forage abroad, but devote their efforts to the care and preservation of the eggs within the ant hill. After the foraging ants have thus been destroyed and the supply of food thereby diminished, then the warrior ants, and perhaps the nurse ants, will also go out and fall into the trap. In a few days the eggs that have been previously deposited are hatched, and since the incoming supply of food is cut off, the newly hatched ants, together with all of the ants remaining in the ant hill, will be compelled by hunger to forage, and will drop into the trap, whereupon the entire colony is thoroughly destroyed.

In some instances dust or refuse of various kinds may be blown into the depression, or small sticks and other matter being carried by the ants toward the ant hill will be left by them in the depression in quantities enough to fill the depression, and thus permit the ants to travel over it. Therefore, it is desirable to inspect the ant traps at least once a day, and if anything has been deposited in the depression, the operator can simply elevate the trap and shake all of the refuse within the depression toward the corner containing the outlet, and then shake it out of this outlet and replace the trap in its original position. It is not at all important that the trap be rectangular as shown, nor is it essential that it be shaped to completely encircle the ant hill, because some obstruction could be provided over which ants could not pass, to compel them, when moving toward or from the ant hill, to pass into a trap which did not completely surround the ant hill.

I have found that sheet metal with a heavy coating of tin is very desirable for this purpose, as it retains its polished surface for a long time in such smooth condition as will prevent the ants from obtaining such traction as would prevent them from sliding into the trap.

In many species of ants a considerable number of them at a certain period of their existence have wings. I have discovered that the winged ants, after they emerge from the ant hill, usually walk a considerable distance before commencing to fly, and hence readily walk into the trap, and after they are once in the trap, it is impossible for them to use their wings in such a manner as to permit them to escape from the trap. Hence the winged ants are caught in the trap the same as the ants without wings.

In the foregoing specification I have described the device as being intended for use as a trap for ants. Obviously the same device can be used for other similar insects.

I claim as my invention:

An ant trap comprising in combination, a body portion shaped to completely surround an ant hole and having inner and outer walls spaced apart, the upper ends of the walls being curved first downwardly and then toward the walls, an outlet member communicating with the body portion and comprising a bottom, sides and top extended upwardly and outwardly, the outer end of the bottom being curved first outwardly and downwardly and toward the body portion, the sides of the outlet portion being arranged in engagement with the sides of the bottom portion and being extended outwardly beyond the bottom portion and downwardly beneath the bottom portion, the top member of the outlet portion being extended directly above the bottom member and projected outwardly from the body beyond the bottom portion, substantially as and for the purposes stated.

Des Moines, Iowa, October 2, 1924.

WILLIAM F. COOK.